United States Patent [19]
Squitieri

[11] Patent Number: 6,012,245
[45] Date of Patent: Jan. 11, 2000

[54] DISPLAY FRAME INSERT

[75] Inventor: Frank Squitieri, 495 4th St., Brooklyn, N.Y. 11215

[73] Assignee: Frank Squitieri, Brooklyn, N.Y.

[21] Appl. No.: 09/178,344

[22] Filed: Oct. 26, 1998

[51] Int. Cl.$^7$ ................................................. A47G 1/06
[52] U.S. Cl. .............................................. 40/735; 40/732
[58] Field of Search .......................... 40/735, 732, 701, 40/729, 768, 777, 158.1

[56] References Cited

U.S. PATENT DOCUMENTS

| | | | |
|---|---|---|---|
| 100,962 | 3/1870 | Adams | 40/735 |
| 118,380 | 8/1871 | Monroe | 40/735 X |
| 4,497,125 | 2/1985 | Hutchinson | 40/657 |
| 4,553,344 | 11/1985 | Rubin et al. | 40/735 |
| 4,590,696 | 5/1986 | Squitieri . | |
| 5,367,802 | 11/1994 | Rosenberg | 40/732 |

*Primary Examiner*—Terry Lee Melius
*Assistant Examiner*—William L. Miller

[57] ABSTRACT

A polymeric resin molded frame insert is combined fittingly with a molded polymeric resin frame to produce a display frame with four centrally disposed symmetrical display openings, with four compact disc cases secured thereon so that the transparent front cover of each compact disc case appears in one of the four display openings, showing therethrough whatever items of visual interest have been installed behind the compact disc case covers.

4 Claims, 2 Drawing Sheets

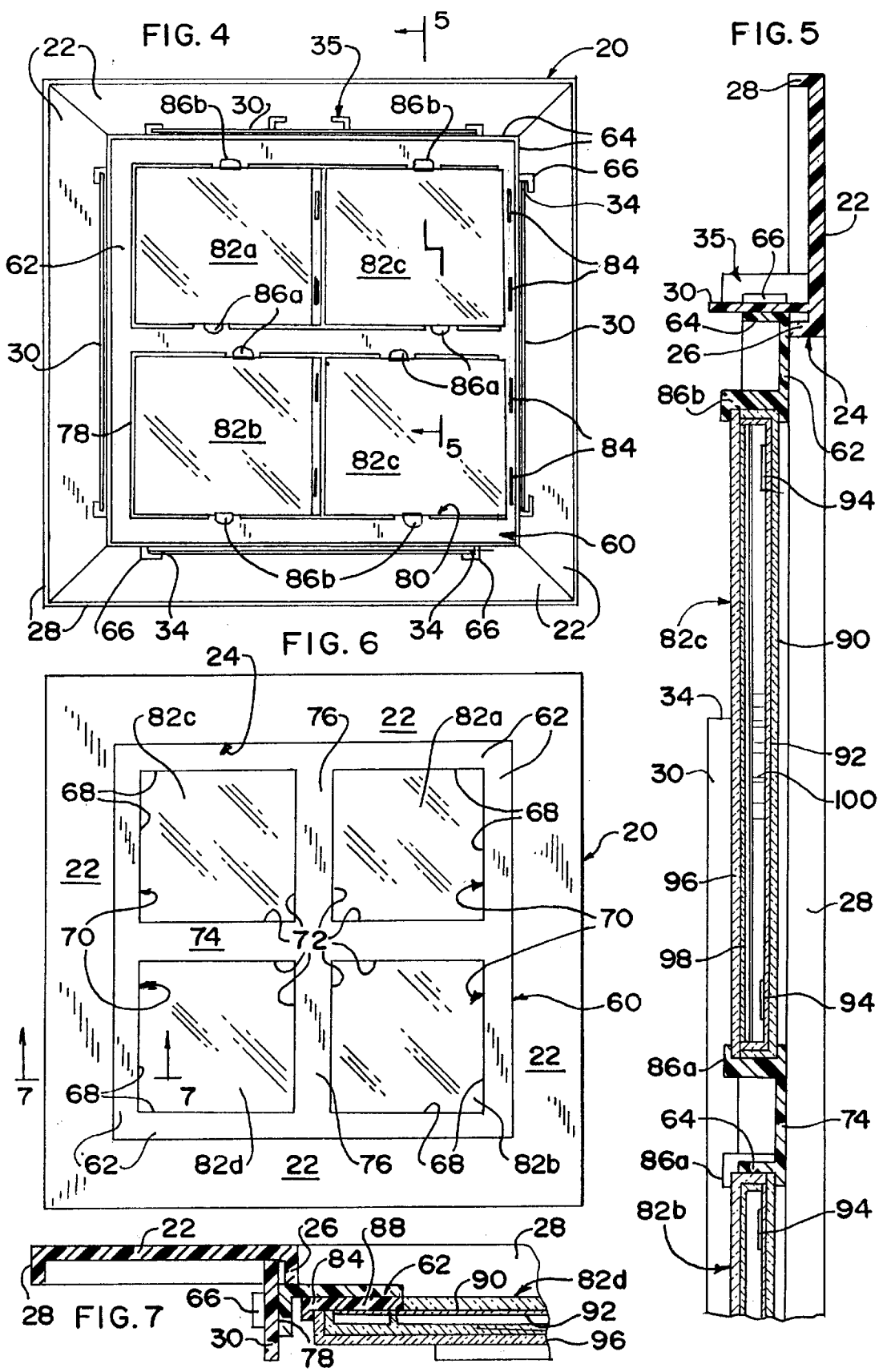

6,012,245

DISPLAY FRAME INSERT

BACKGROUND OF THE INVENTION

A. Field of the Invention

This invention relates to display frames molded from synthetic resin polymers, and more specifically to a frame insert, molded from the same material, which subdivides the frame's display space into four equal display windows.

B. Description of the Prior Art

The pertinent prior art is my U.S. Pat. No. 4,590,696, issued on May 27, 1986, titled: "Display Frame Assembly" and now expired. All of the frame embodiments covered in this patent are directed toward holding and displaying objects of visual interest, including paintings, prints, photographs, textiles and especially artistic and colorful phonograph album covers. These patented molded synthetic resin frames each have outer surrounding walls which not only define the centrally disposed display opening but also carry frame-reinforcing ribs projecting perpendicularly, rearwardly from the rear surfaces of the frame walls, and parallelly spaced from the display opening, to form a nest into which the object to be framed can be fittingly inserted. Full details of the structure of the frames will be found in the above-designated patent and will be included hereinafter in the description of embodiments of the present invention, which combines these frames with the novel frame insert herein disclosed, defined and claimed.

SUMMARY OF THE INVENTION

The substantially square frame insert of this invention is dimensioned so that its rearwardly projecting outer peripheral walls fittingly engage the inner surfaces of the frame's rearwardly projecting reinforcing ribs and the frame nests therein, held frictionally in place by integral hooks molded on the insert's outer rims. These hooks are positioned to engage snugly each of the frame's rearwardly projecting rib ends. The frame insert subdivides a frame's display space into four equal-sized windows and supportively retains, by spacing ribs and clips, four compact disc cases therein, thus offering a view of a symmetrically positioned quartet of compact disc labels, brochures or other visually attractive photographs, paintings, prints, design fabrics or the like which have been inserted against the inner front face of each compact disc case. Full details of the preferred embodiments of the frame insert of this invention will be disclosed in connection with the accompanying illustrative, but not limiting, drawings, wherein:

BRIEF DESCRIPTION OF DRAWINGS

FIG. 4 is a rear elevational view of the completed assembly of prior art frame, frame insert and four compact disc cases in place;

FIG. 5 is a sectional view taken along line 5—5 of FIG. 4;

FIG. 6 is a front elevational view of the completed assembly of FIG. 4; and

FIG. 7 is a sectional view taken along line 7—7 of FIG. 6.

DESCRIPTION OF THE PREFERRED EMBODIMENTS

Figure 1:
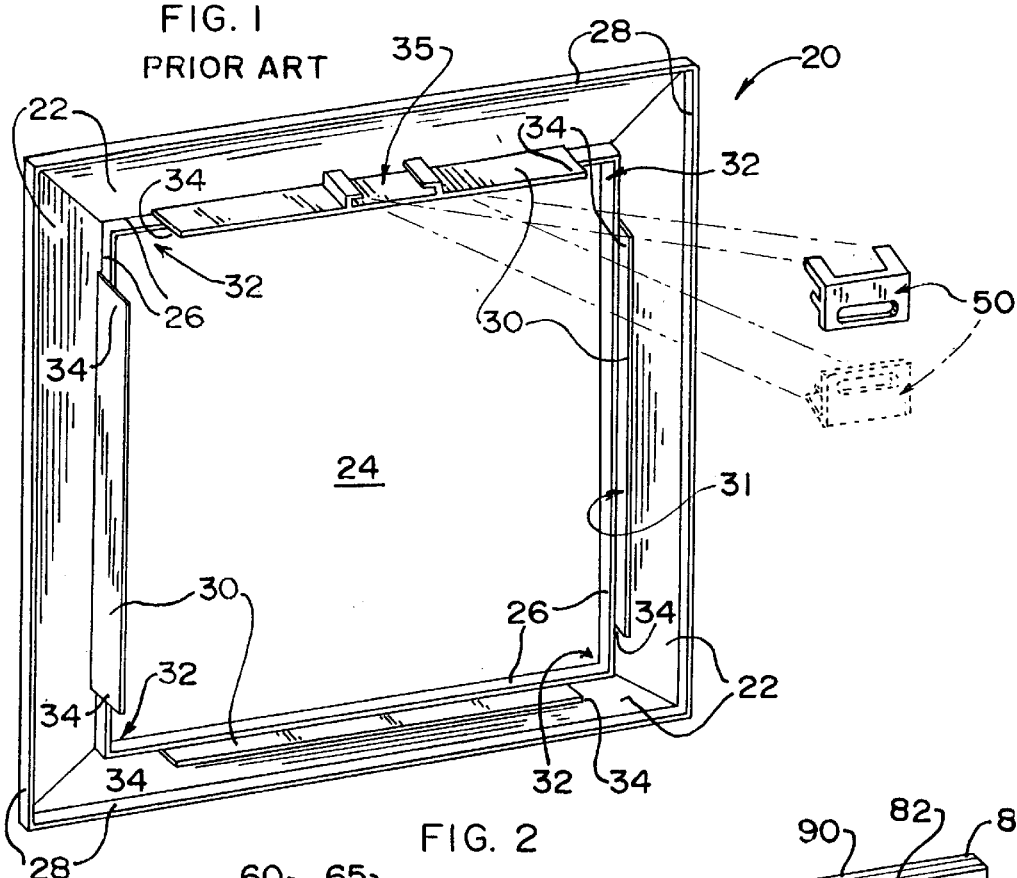
FIG. 1 is a left rear top perspective view of a prior art frame as disclosed in U.S. Pat. No. 4,590,696, to be used in combination with the frame insert of this invention.

The prior art patented molded shadow box frame 20 shown in FIG. 1 is formed of walls 22, surrounding and defining display opening 24, walls 22 extending from inner rearwardly turned rims 26 to outer rearwardly turned rims 28. Integrally molded reinforcing ribs 30 project rearwardly from the rear surfaces of walls 22 and follow a path intermediate between inner rims 26 and outer rims 28, forming nest 31. Gaps 32 interrupt ribs 30 at the corners to provide rib and gap edges 34. One wall 22 of frame 20 also carries frame coupling means 35 to be coupled with mounting bracket 50, shown here in alternative mounting positions for selective hanging of frame 20 therefrom.

Frame 20 can be produced advantageously by one-piece molding. While many synthetic resin materials may be used for this purpose, considerations of strength, flexibility and cost make the preferred choice medium impact styrene; for superior decorative character, however, another form of styrene known commercially as ABS may be substituted for this purpose. Frame insert 60 shown in FIG. 2, the subject of the present invention, can likewise be formed by one-piece molding, and of the same material as frame 20.

Figure 2:
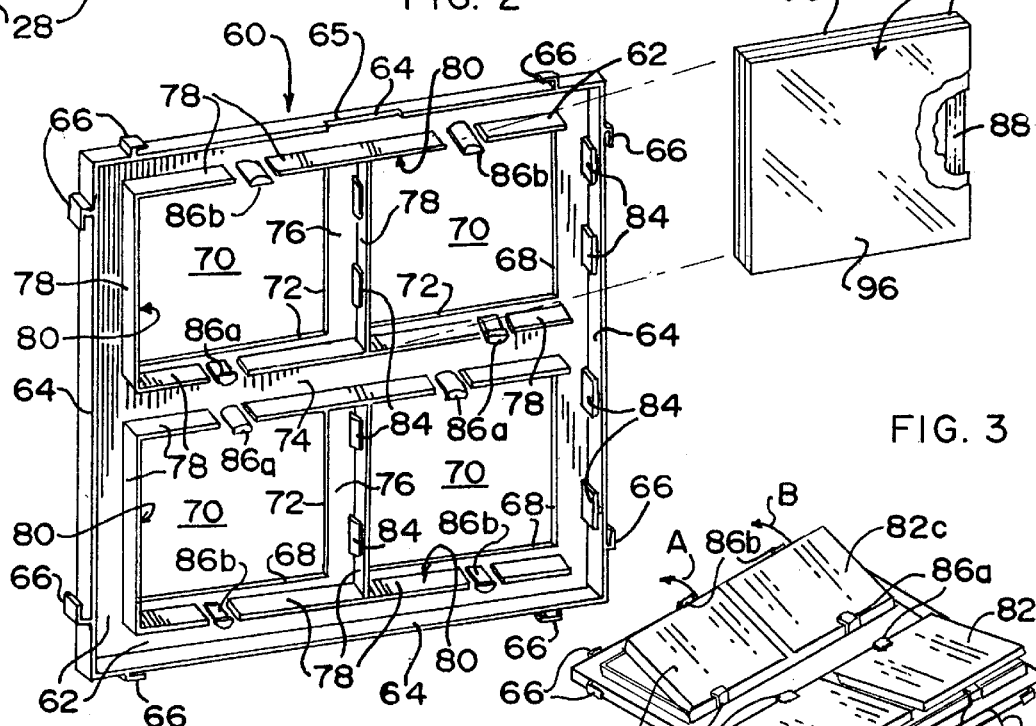
FIG. 2 is a left rear top perspective view of a preferred embodiment of the frame insert of this invention, together with a compact disc case for insertion therein.

As seen in FIG. 2, frame insert 60 is of square configuration, comprising four flat connected walls 62 terminating outwardly at rearwardly projecting peripheral rims 64. Each rim 64 carries integrally on its surface two L-shaped hooks 66 projecting therefrom and facing each other. Hooks 66 are so dimensioned, spaced and positioned that when frame insert 60 is placed in nest 31 of frame 20, each hook 66 surrounds and fittingly frictionally engages frame 20's correspondingly located reinforcing rib ending 34, and insert rims 64 fittingly contact the corresponding inner surfaces of ribs 30, thus securing together the assembled frame 20 and frame insert 60, best seen in FIG. 4. Returning to FIG. 2, top frame insert rim 64 has centrally disposed cutout 65 at its rearmost edge to accommodate mounting bracket 50 for hanging frame 20

Walls 62 of frame insert 60 extend inwardly to surround and define outer borders 68 of four equal-sized symmetrically disposed square display openings 70, their inner borders 72 being defined by centrally positioned horizontal wall 74 and centrally positioned vertical walls 76 joined to each other at their inner ends and each joined at their outer ends to one of the four frame insert walls 62. Adjacent display openings 70, ribs 78, rearwardly extending from walls 62, 74 and 76, define three sides of each of four nests 80, into each of which one compact disc case 82 may be inserted for display. The fourth side of each nest 80 is provided by a spaced pair of spacing ribs 84 to retain each compact disc case 82 fittingly therein. The horizontal stretches of ribs 78 are interrupted at intervals by inwardly-lipped retaining clips 86 (shown as non-aligned, but may be in line as well) molded with, and extending rearwardly from, frame insert 60, one clip 86 being positioned at the top and the bottom of each compact disc case 82 to lock it securely in place but removable therefrom, as discussed hereinafter in connection with FIG. 3.

It will be observed in FIG. 2 that compact disc case nests 80 are offset with respect to display openings 70, nests 80 overlapping either vertical walls 76 or walls 62. In this way, spines 88 of compact disc cases 82 are concealed from view when mounted in the frameframe insert assembly, and only the square transparent portion of each compact disc case 82 and the visually desirable display material 92 positioned therein may be seen, as shown in FIGS. 6 and 7.

Figure 3:
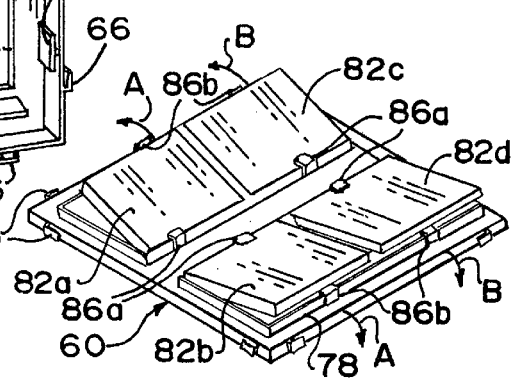
FIG. 3 is a left front top perspective view of the frame insert of FIG. 2, with four compact disc cases in the process of being installed therein.

FIG. 3, as indicated above, illustrates the method of inserting compact disc cases 82 into frame insert 60 before its assembly with frame 20. Here, frame insert 60 has been placed rear side up on a flat surface (not shown) with its top rim 64, having cutout 65 therein, facing upwardly. The four compact disc cases 82a, 82b, 82c, 82d each in its nest 80 have been oriented so that their tops also face upwardly, their rear sides are exposed, with the edge of each case 82 closest to the center of frame insert 60 held in place by inner locking clips 86a, while the outer edges of cases 82a–d each rests on the top of its corresponding outer locking clip 86b. To complete the locking-in process, one needs only first to flex frame 60 gently at and in the direction of arrows A, causing cases 82a and 82b to fall into place and be engaged by their respective locking clips 86b, then to repeat the procedure at arrows B to lock in cases 82c and 82d. For removing compact disc cases 82a–d for replacement, the same flexing of frame insert 60, with a slight push against the bottom of each disc case 82, will release locking clips 86b.

The assembled frame insert 60, with compact disc cases 82 locked in place, is shown in FIGS. 4, 5, 6 and 7 nested in frame 20, with the combination ready for hanging. In FIGS. 5 and 7, compact disc cases 82 each has front cover portion 90, with a visually interesting display object 92 slidably mounted against the inner face thereof, held in place by disc case retaining clips 94, to be seen therethrough when frame, frame insert and compact disc case assembly of FIGS. 4–7 are hung. Bottom portion 96 of each compact disc case 82 carries compact disc support liner 98 with spindle 100 for centrally retaining any compact disc (not shown) positioned within disc case 82.

It is within the concepts of this invention that frame 20, shown in this specification as a shadow box frame, can take the form of other frame embodiments disclosed in U.S. Pat. No. 4,590,696, such as a beveled or museum frame. Frame 20 and frame insert 60 can be provided in exactly matching color and finish, or, for reasons of design appearance, can be supplied in complementary or contrasting colors and in a variety of finishes, from glossy to matte to textured. It is also clear that the choice of a visually attractive quartet of compact disc labels, brochures, photographs, paintings, prints, fabric designs and the like in the quartet of display spaces can challenge the frame-frame insert user to find artistic imagination and creativity in arranging a display of strong visual interest.

The concepts of this invention have been disclosed; various substitutions and embodiment changes are contemplated without departing from the spirit and scope of the invention, which is limited only by the scope of the ensuing claims, wherein:

What is claimed is:

1. A frame assembly for displaying four compact disc cases comprising: an integrally molded polymeric resin frame means, said frame means comprising continuous walls and a centrally disposed display opening surrounded by and defined by said continuous walls, said frame means having frame-reinforcing rib means projecting rearwardly from, and substantially perpendicular to, a rear surface of of said continuous walls of said frame means, said rib means being positioned and generally extending along a path intermediate between inner and outer edges of said continuous walls of said frame means, so that a nest, formed by and comprising inner walls of said frame-reinforcing rib means and a portion of said rear surface of said continuous walls of said frame means extending between said rib means and said centrally disposed display opening, is provided, said reinforcing rib means of said frame means being formed with a plurality of gaps at spaced intervals, said gaps creating a plurality of free terminal ends on said reinforcing rib means; and a one piece integrally molded polymeric resin frame insert means, said frame insert means comprising continuous walls with four centrally disposed display openings surrounded by and defined by said frame insert continuous walls, said frame insert means being dimensioned to be placed fittingly in said nest of said frame means, said frame insert means further comprising means for securing said four compact disc cases fittingly on a rear of said frame insert means such that when said four compact disc cases are secured to said insert means, a transparent cover of each of said four compact disc cases appears in one of said four centrally disposed display openings, thus displaying four objects of visual interest selectively placed inside said compact disc case covers before assembly of said compact disc cases.

2. The assembly as defined in claim 1, further comprising:

said frame insert means being substantially square in outline, said continuous walls thereof terminating at all outer peripheral edges with a continuous rim perpendicular to said frame insert continuous walls and rearwardly projecting therefrom; and a plurality of integral hooks molded on surfaces of said rearwardly projecting rim, said hooks being so dimensioned, oriented and located that when said frame insert means is inserted into said nest in said frame means, each said hook fittingly surrounds and frictionally engages one of said free terminal ends of said frame-reinforcing ribs on said frame means, whereby said frame means and said frame insert means are removably held together.

3. The assembly as defined in claim 1, wherein said means for securing said four compact disc cases comprise:

rearwardly extending ribs substantially surrounding each of said four centrally disposed display openings, said rearwardly extending frame insert ribs forming nests adapted to be dimensioned so that said four compact disc cases can be fittingly introduced therein; and rearwardly extending locking clips positioned in gaps in said rearwardly extending frame insert ribs, one said locking clip at a top and a second said locking clip at a bottom of each said compact disc case nest to removably secure one of said compact disc cases therein.

4. The assembly as defined in claim 3, wherein each said compact disc case nest is offset with respect to each of said four centrally disposed display openings such that when said four compact disc cases are secured to said insert means, only said transparent cover on each said compact disc case is visible through each said display opening, while the spine of each said compact disc case remains concealed behind said continuous walls of said frame insert means.

* * * * *